Oct. 16, 1928.

Re. 17,104

A. SCHONENBERGER

WASHER SORTING AND STRINGING MACHINE

Original Filed Nov. 24, 1924 2 Sheets-Sheet 1

INVENTOR

BY Aloys Schonenberger

Floyd E. Shannon ATTORNEY

Oct. 16, 1928. Re. 17,104
A. SCHONENBERGER
WASHER SORTING AND STRINGING MACHINE
Original Filed Nov. 24, 1924 2 Sheets-Sheet 2
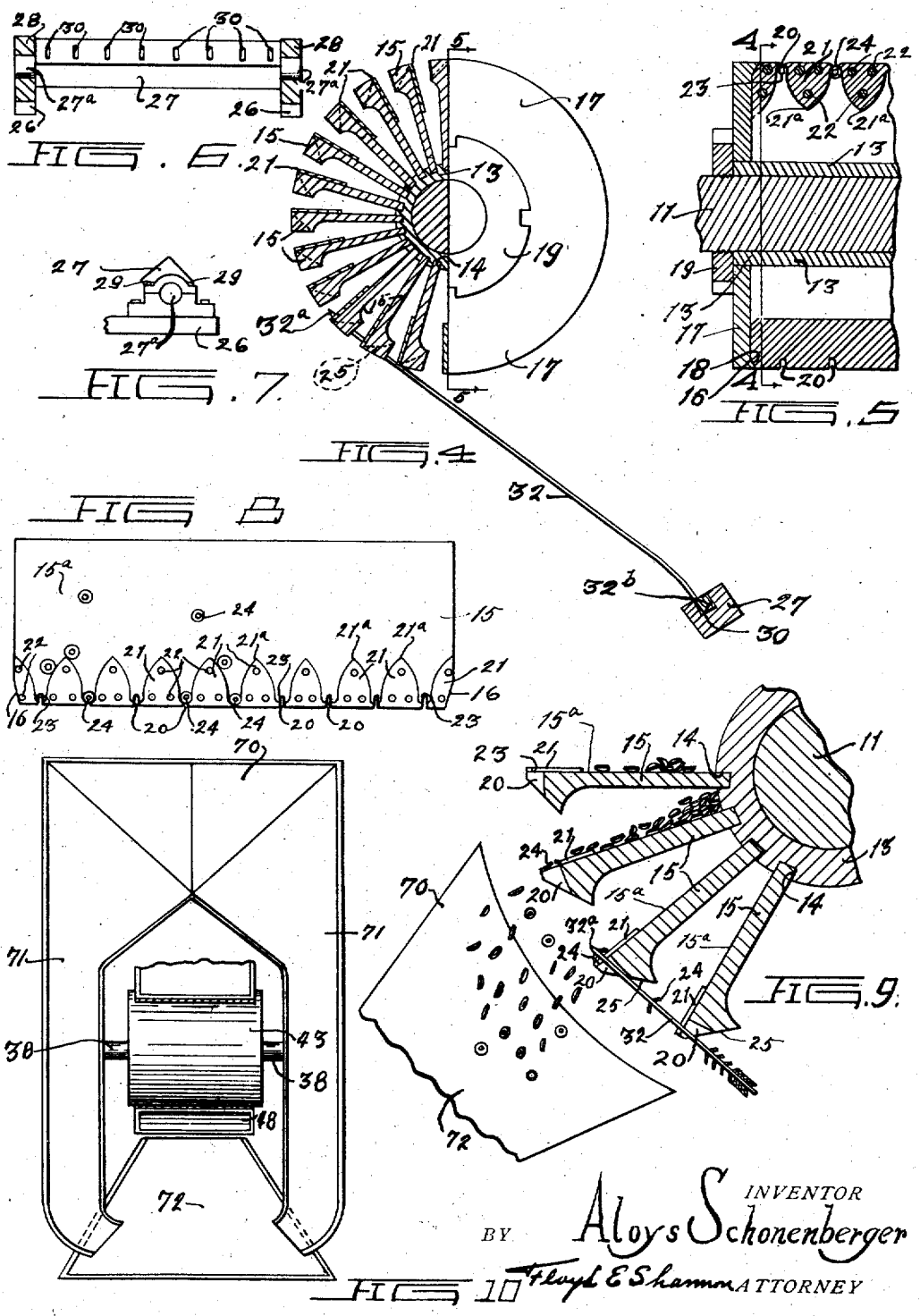
INVENTOR
Aloys Schonenberger
BY Floyd E Shamm ATTORNEY Reissued Oct. 16, 1928.

Re. 17,104

UNITED STATES PATENT OFFICE.

ALOYS SCHONENBERGER, OF SPRINGFIELD TOWNSHIP, SUMMIT COUNTY, OHIO, ASSIGNOR TO HIMSELF AND FLOYD E. SHANNON, OF AKRON, OHIO.

WASHER SORTING AND STRINGING MACHINE.

Original No. 1,598,748, dated September 7, 1926, Serial No. 752,075, filed November 24, 1924. Application for reissue filed July 7, 1928. Serial No. 291,094.

This invention relates to new and useful means for automatically sorting and stringing washers or other perforated articles.

The invention is primarily intended to provide means for sorting and stringing concavo-convex washers of the type commonly used in rubber heels, but it may be used to an equal advantage in sorting other articles of a similar shape and may be used to string flat washers or other flat articles.

Objects of the invention are to provide a strong, durable machine of simple, inexpensive construction which will automatically string washers or other perforated articles on a wire or other elongated member.

A further object is to provide a machine which will automatically sort and string concavo-convex washers and coaxially position the same in nested relation whereby the same may be conveniently shipped or handled and will be ready for use in a washer applying device.

A further object is to provide a machine which will accurately sort and string washers on wires with great rapidity and to provide new and improved means for supporting said wires whereby the same may be conveniently removed and replaced when filled with washers and which will automatically disengage the wire when the same is filled with washers.

Other objects are to provide a new and improved washer sorting wheel and to provide a new and improved washer sorting plate whereby washers may be held in a desired position and strung on a wire and to provide new and improved means for feeding washers thereto.

The above objects are accomplished and additional ends are attained by the novel construction, combination and arrangement of parts herein described and illustrated in the accompanying drawing wherein I have shown a preferred form of the invention, designed for use in sorting and stringing concavo-convex heel washers, it being understood that the invention is capable of various adaptations and that changes and modifications may be made or resort had to substitutions which come within the scope of the claims hereunto appended.

In the drawings in which like characters of reference are used to denote like parts as the same may occur in any of the several views and in which:—

Figure 4 is a view partly in end elevation and partly in vertical transverse section showing a washer sorting wheel constructed in accordance with this invention, the sectional view being taken as indicated by the lines 4—4 of Figure 5.

Figure 5 is a fragmentary sectional view of said wheel taken as indicated by the lines 5—5 of Figure 4.

Figure 6 is a vertical, sectional view of the supply brackets taken as indicated by the lines 6—6 of Figure 1 and showing a front elevational view of my improved wire holding means.

Figure 7 is an end view of the wire holding member, also showing in side elevation a portion of the bracket in which the same is mounted.

Figure 8 is a plan view of one of the plates employed in my improved washer sorting wheel.

Figure 9 is a fragmentary, sectional view of a washer sorting and stringing wheel illustrating washers in position thereon and the manner in which the same are strung on the wires and also showing the upper portion of the chute into which surplus washers fall from the wheel.

Figure 10 is a plan view of the chutes employed in feeding washers to buckets on the conveyor belt in returning surplus washers thereto.

Figure 1:
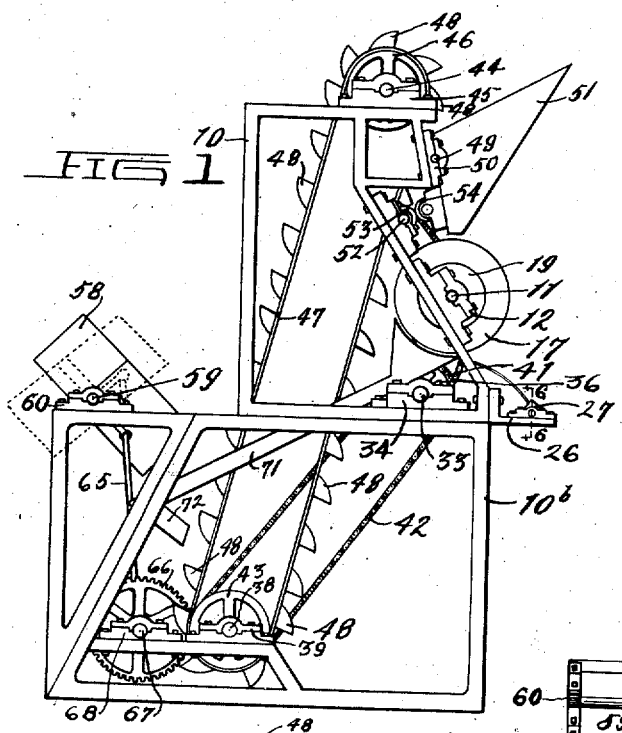
Figure 1 is a side elevational view of a washer sorting and stringing machine constructed in accordance with this invention.
Figure 11:
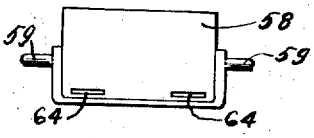
Figure 11 is a front, elevational view of the feeding box employed in carrying out the invention.
Figure 2:
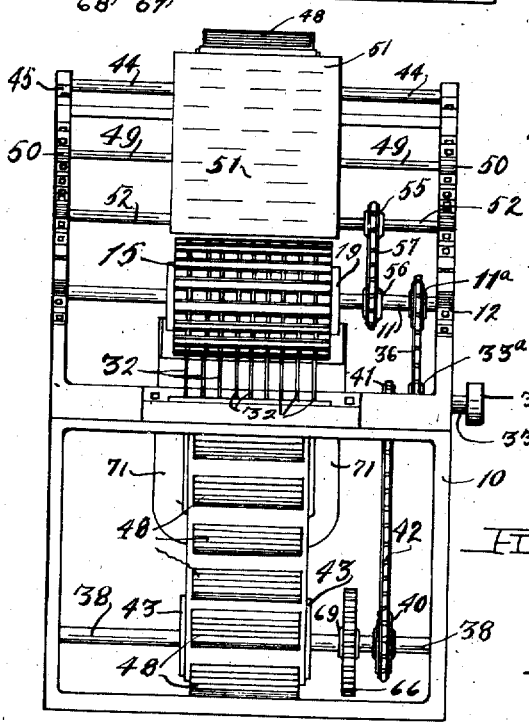
Figure 2 is a front, elevational view of same.
Figure 3:
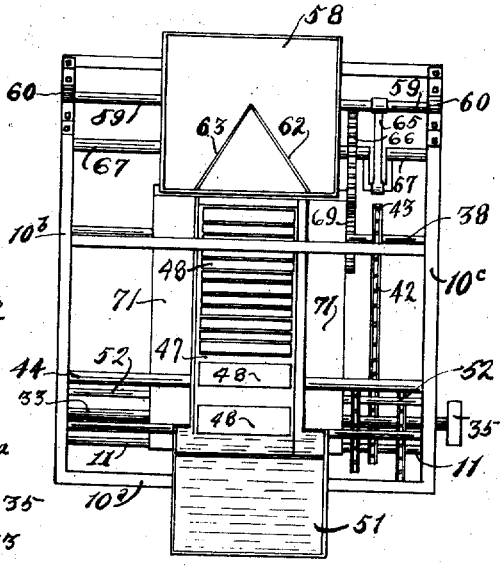
Figure 3 is a top plan view of same.

From the following description, it will be seen that the essence of the invention lies in the provision of a rotatable member having a plurality of washer holding seats associated therewith to extend in a circumferentially extending row whereby each seat will be presented to the point of a wire upon rotation of the member and particularly in the provision of a groove or other means on the member itself for receiving the free end of the wire and guiding or holding the point thereof in a position where washers positioned in said seats, will upon rotation of the member be carried forwardly and strung on the wire.

Briefly described, the invention provides a plate having washer engaging or other retaining means along one edge thereof and provide mechanism for depositing washers upon the plate and means to incline the plate to a plane which will cause the washers to slide over said edge and fall therefrom, certain of said washers being retained along said edge by said engaging means and presented in a convenient position for stringing upon a wire.

Obviously, the said plate may be mounted in various ways and various means and mechanism may be employed to feed washers thereto, all within the spirit of the invention, but it has been found that the form of the invention illustrated in the drawings is particularly adapted for use in sorting and stringing concavo-convex conical or similarly shaped heel washers.

In the drawings, the numeral 10 is used generally to denote a sutable frame and the characters $10^a$ denote the front of said frame, the characters $10^b$ the left side thereof, the characters $10^c$ the right side thereof and the characters $10^d$ the rear of said frame. The numeral 11 denotes a horizontal shaft which is rotatably mounted in suitable bearings 12 to extend across the forward side $10^a$ of the frame. Mounted on the shaft 11 is a hollow cylindrical hub 13. The hub 13 is provided with a circumferentially extending series of closely spaced, parallel, axially directed slots 14. In each of said slots is mounted a plate 15, thus forming a plurality of blades each projecting radially from said hub. Each plate 15 is provided at each outer corner thereof with a surface 16 which is inclined to the outer and lateral edges of the plate. The numeral 17 denotes disks, one of which is mounted on each end of the hub 13. The inner face of each disk 17 is provided adjacent the circumferential edge thereof with a concentrically arranged, annular flange 18 adapted to engage the corner edges 16 and retain the blades 15 in said grooves. The numeral 19 denotes nuts, one of which is threaded on said shaft 11 at each end of the hub 13 to engage the plate 17 and hold the wheel in assembled relation.

Each plate 15 is substantially rectangular in form and is provided at the outer edge thereof with a pluralty of spaced slots 20. Each plate 15 is provided at the outer edge thereof with a pluralty of relatively thin plates 21 which are secured thereto by means of the rivets 22 or other suitable fastening means, each plate 21 is secured to a similar side $15^a$ of the plate 15, one of said plates 21 being positioned at each side of each slot 20. Each plate 21 is substantially triangular in form and are each disposed on said plate with the straight side thereof in alinement with the outer edge of the plate and extend between two of the slots 20, the other sides of the plate 21 extending inwardly along curved lines and converge to a point $21^a$; the said point being positioned in spaced relation to the hub 13. The contour of the plates 21 is such that the opposite edges of adjacent plates form a seat 23 over each slot 20. Each seat 23 is adapted to receive a heel washer 24 and hold the same in position with the aperture of the washer in communication with the slot 20. The plates 21 are of substantially the same thickness as the washers 24, whereby a concave-convex washer will be retained in said seat if presented thereto, with the concave side of the washer against the plate 15, but in case a washer is positioned on the blade 15 with the convex side thereof in contact with the said plate, it will not be engaged by the stop plates 21 and will fall therefrom when the plate is inclined as hereinafter described. The lateral edges of each plate 15 are square and the outer edges of each plate are inclined to provide an inclined face 25, the purpose of which will be hereinafter described.

The numeral 26 denotes a bracket which is suitably secured in a central position to the forward side $10^a$ of the frame 10. The bracket 26 supports suitable bearings 28 in which is mounted a wire holding member 27. The wire holding member is rectangular in cross section and is provided at each end thereof with a trunnion $27^a$, one of said trunnions being mounted in each bearing 28. Each bearing 28 is provided with bolts 29 which may be operated to tighten the bearing whereby the member 27 may be frictionally engaged and adjustably held against rotation. One face of the member 27 is provided with a plurality of elongated recesses 30 which are arranged in longitudinally extending row as shown in Figure 6.

The numeral 32 denotes a wire adapted for use on my improved machine. The wire 32 is tapered at the upper end thereof to provide a relatively sharp point $32^a$ and at the lower end thereof the wire 32 is turned back to provide the portion $32^b$ whereby the lower end of each wire will fit in one of the slots 30. As will be seen by an examination of Figure 4, the member 27 is arranged so that the upper end of each of the wires 32 is positioned with the upper end of the wire directly in the path of a washer positioned in one of the seats 23 and that the said wire is received in the slot 20 on two of the plates 15 with its point presented to a slot 20 in the plate 15 which is positioned immediately above said plates whereby a rotary movement of the shaft 11 will bring the opening in a washer positioned in each seat 23 directly above the point of a wire 32 and will position the said washers on the wires.

The numeral 33 denotes a drive shaft which is mounted in suitable bearings 34 and extends transversely of the frame 10, in parallel relation to the shaft 11. The shaft 11 is provided at a point adjacent the side 10[c] of the frame 10 with a sprocket wheel 11[a] which is fixed thereto and the drive shaft 33 is provided with a like sprocket wheel 33[a] which is fixed thereto at a point in the plane of rotation of the sprocket wheel on the shaft 11. The said sprocket wheels are operatively connected with the drive chain 36, whereby a rotation of the shaft 33 will cause a rotation of the shaft 11. The shaft 33 projects from the side 10[c] and is provided with a drive pulley 35. The numeral 38 denotes a shaft which is mounted in suitable bearings 39 to extend transversely of the machine in parallel relation with the shafts 11 and 33 and the numeral 40 denotes a sprocket wheel which is fixed to said shaft 38. The numeral 41 denotes a sprocket wheel which is fixed to the shaft 33 at a point in a plane of rotation with the sprocket wheel 40, and the wheels 40 and 41 are operatively connected with the sprocket chain 42.

The numeral 43 denotes a drum which is coaxially fixed on the shaft 38. The numeral 44 denotes a shaft which is mounted in suitable bearings 45 so as to extend transversely across the top of the frame 10 in parallel relation to the shaft 38. A drum 46 is mounted on the shaft 44 and a conveyor belt 47 is operatively mounted on the drums 43 and 46. The conveyor belt 47 is provided with a longitudinally extending series of buckets 48 which are secured thereon in close spaced relation for a purpose to be hereinafter described.

The numeral 49 denotes a shaft which is secured in suitable bearings 50 at a point adjacent the top of the frame 10 so as to extend transversely thereacross. A hopper 51 is fixed to said shaft 49 so as to be capable of limited rotary movement on the axis thereof. The hopper 51 is provided with a relatively large mouth and the lower end thereof is positioned directly above the improved washer supporting wheel. The numeral 52 denotes a shaft which is mounted in suitable bearings attached to the forward face 10[a] of the frame. The shaft 52 is provided with a cam wheel 53. The hopper 51 is provided at the rear side thereof at a point adjacent the lower end thereof with a wheel 54 which is positioned thereon to operatively contact with the cam 53 whereby a rotation of the shaft 52 will cause an oscillating movement of the hopper 51. The shaft 52 is provided with a sprocket wheel 55 and the shaft 11 with the sprocket wheel 56 and the said sprocket wheels are operatively connected by a sprocket chain 57 whereby a rotation of the shaft 11 will cause an oscillating movement of the hopper 51.

The numeral 58 denotes a supply box which is fixed to the shaft 59, the said shaft being mounted in suitable bearings 60 whereby the box 58 may be rocked as illustrated by the dotted line position shown in Figure 1. The box 58 is square and provided with the vertical plates 62 and 63 which are secured together adjacent the center of the box, each extending to the forward wall of the box at points in spaced relation to the lateral sides thereof. The box is provided on the forward wall thereof with two slots 64 each positioned adjacent the lateral side thereof with the lower wall of each slot on a level with the bottom of the box. The numeral 65 denotes a pitman rod, one end of which is secured to the box in spaced relation to the shaft 59 and the other end thereof is pivotally secured to the gear wheel 66. The wheel 66 is mounted on a stub shaft 67 which is journaled in a suitable bearing 68 at a point adjacent the bottom of the frame. The numeral 69 denotes a gear wheel which is fixed on the shaft 38 so as to mesh with the teeth on the wheel 66 whereby a rotation of the shaft 38 will cause a rocking movement of the box 58.

The numeral 70 denotes a funnel-like receptacle which is positioned below the washer sorting wheel so as to receive the washers as they fall therefrom. The funnel 70 communicates with two chutes 71, one of which is positioned on one side of the belt 47 and the other positioned on the other side thereof. The chute is being inclined downwardly so that washers deposited therein will slide by the force of gravity therethrough. At the lower end of the funnel 70, the chutes 71 empty into the chute 72 which is positioned below the lower end of the chute 71 so as to receive the supply of washers delivered thereby and direct the same into the cups 48 on the belt 47. The openings 64 are formed in the box 58 so that one of said openings is directly above each of the chutes 71 whereby a supply of washers 24 will be directed through one of said openings 64, each time the forward end of the box is moved downwardly by the rod 65, thus continually depositing a supply of washers to the cups 48.

In use, the wire holding member 26 is rotated in the bearings 28 to place it in a position whereby the wires 32 may be placed in the recesses 30 with the upper end of each wire entered in one of the slots 20 in two or more plates 15. The arrangement is such that each wire 32 when placed in an operative position will be slightly flexed whereby the spring in the wire will hold it in the notches 20, while the sides of the said notches 20 will prevent the lateral movement thereof. Inasmuch as each wire 32 is entered in alined notches 20 of adjacent plates 15, the point of the wire will be presented directly beneath a seat 23 as each plate is moved toward the wire by the rotation of the shaft 11.

To operate my improved machine, a quantity of washers are placed in the box 58. Power is applied to the shaft 35 whereupon a rocking movement is imparted to the box 58 by the pitman 65. At each downward movement of the pitman 65, the supply of washers are carried forward in the box 58 whereupon a limited number of washers pass through the openings 64 and are deposited upon the chute 71 from which they pass by the force of gravity to the chute 72 and are fed into the cups 48 on the belt 47, the belt being operated as aforesaid carries the washers thus deposited in the cups 48 to the hopper 51. The lower end of the hopper 51, being positioned directly above my improved washer sorting wheel, deposits a quantity of washers in the space between each plate 15 and the plate adjacent thereto. The rotation of the shaft 11 carries each plate 15 downwardly to an inclination which will cause the supply of washers to slide along the plate and fall therefrom. In sorting concave-convex washers, the washers having their concave slide in contact with the upper edge of the plate 15 will be engaged by the retaining plates 21 whereby a washer will be positioned, concave side down in each of the seats 23, all of the washers excepting those positioned in the seats as aforesaid will fall from each plate 15 as the plate is further inclined by the rotation of the shaft 11 and will fall into the chute 71 from which the same will pass to the chute 72 and be thus fed to the cups 48 and again carried to the hopper 51.

It will thus be seen that a washer is properly positioned in each seat 23 and that the point of each wire 32 is positioned in the path of a washer thus held in the seat 23 so that the aperture in the washer is brought over the point of the wire by the rotation of the shaft 11 and that the washers will be thus strung on the wires 32. It will also be seen that as each wire 32 is filled with washers to a point where the uppermost washer will engage the inclined face 25 of the plate 15, that the wire will be moved downwardly out of the slots 20 to a position which will prevent additional washers from being fed thereon. The arrangement is such that as soon as one of the wires 32 is filled with washers that it can be easily and quickly removed from the recess 30 in the member 6 and an unfilled wire placed therein without stopping or in any way interfering with the operation of the machine. The rapid rotation of the cam wheel 53 causes a rapid jarring movement of the hopper 51 thus preventing the washers from clogging in the hopper and causing an even flow of washers therefrom.

While I have shown and described a machine particularly adapted to sort and string concavo-convex washers or washers having a convex or bulged face, it will be understood that the machine may be similarly used to string flat washers on wires and while I have shown particular means for mounting the plates 15 whereby a supply of washers may be placed on a plate and the plate inclined to cause the washers to slide by gravity therefrom, it is to be understood that other means may be employed for inclining said plate and while I have shown the plates 15 provided with a washer engaging and retaining plates 21, it is to be understood that the invention is not to be confined to the particular form of retaining means shown and that any convenient means for engaging a washer and holding the same in position above one of the notches 20 may be employed if desired.

Having thus illustrated my invention and described the same in detail, what I claim as new and desire to secure by Letters Patent is:—

1. In a washer stringing device, a plate having an open notch in one edge thereof, means to engage a washer and hold the same in position over said notch, a wire, means to detachably hold the wire in a fixed position whereby it may be slidably received in said notch and means to move said plate to enter the wire in said notch and impale the washer thereon.

2. In a washer applying device, a plate means to support said plate in an inclined position whereby washers fed thereto will slide over the plate by the force of gravity; the lower edge of said plate provided with a notch, means adjacent said notch to engage one of said washers and detachably hold the same in position with the apertures of the washers in communication with the notch, means to support a wire, means to move the plate towards the wire whereby the wire will be received in said notch and the said washers strung thereon.

3. In a washer applying device, a flat plate having notches in one edge thereof, means to feed a supply of washers to said plate, means adjacent each notch to engage and hold a washer in position with the aperture thereof in communication with the notch, a plurality of wires, means to support said wires with the point of each wire presented to one of said notches and means to move the notched edge of the plate toward the wire whereby the wires will register in said notches and in the aperture of the washers held in position thereabove.

4. In a washer applying device, a rotatably mounted washer applying wheel, including radial plates having notches in the outer edge thereof, means adjacent each notch to engage a washer and detachably hold the same in position directly over each notch.

said notches arranged in circumferentially alined series, means to rotate said wheel and means to support said wires and hold the same in position with the points thereof entered in one of said notches, means to feed a supply of washers to said wheel and means to rotate the wheel whereby the washers held above each notch will be fed on the wire.

5. In a washer applying device, a suitable frame, a horizontal shaft journaled thereon, plates projecting radially from said shaft, each plate provided at the outer edge thereof with a plurality of notches, each notch being in circumferential alinement with the like notches in the other plates, means adjacent each notch to engage a washer and hold the same in a flat position over the notch, a wire supporting device mounted on said frame at a point below said wheel, wires mounted in said support, the upper end of each wire being positioned in one of said notches, means to feed a supply of washers to each plate, whereby the same will slide therefrom when the plate is inclined by the rotation of the shaft and means to rotate said shaft to thread the washer above said notch on the wire positioned therein.

6. In a washer sorting and stringing machine, a suitable frame, a horizontal shaft journaled thereon, a plurality of circumferentially spaced, radial plates carried thereby, each of said plates provided at the outer edge thereof with a plurality of spaced slots, each of said slots arranged in circumferential alinement with a similar slot in the other plates; means adjacent each slot to engage a washer and detachably hold it in a position with its aperture over the slot; means to support a plurality of wires whereby the same will extend transversely of a radius of said shaft and will be held in a flexed condition with the end portion thereof bearing against the bottom of one of said slots and the point thereof positioned in the path of the washer held over the like slot in the adjacent plate; means to feed a supply of washers between adjacent plates while the same are positioned above the shaft; means to rotate said shaft whereby the plates will be carried to an inclined position which will cause the supply of washers to slide therefrom depositing certain of said washers in said holding means whereby the washer held over said slots will be carried forward to said wires and strung thereon.

7. In a machine for sorting and stringing washers of concavo-convex shape, a suitable frame, a washer sorting wheel mounted thereon, said wheel having a plurality of circumferentially spaced, radial plates, each of said plates provided at the outer edge thereof with a plurality of spaced slots, arranged in circumferential alinement with a similar slot in the other plates; stops arranged adjacent each slot, said stops projecting from the face of the plate a distance approximately equal to the thickness of the peripheral edge of the washers whereby a dished washer will be engaged thereby if presented thereto with its concave side in contact with the plate and held in position with its aperture over the slot; means to support a plurality of wires whereby the same will extend transversely of a radius of said wheel and will be held in a flexed condition with the end portion thereof bearing against the bottom of one of said slots and the point thereof positioned in the path of the washer carried over the like slot in the adjacent plate; means to feed washers to the wheel; means to rotate the wheel whereby the plates will be carried to an inclined position which will cause the supply of washers to slide therefrom; certain of said washers being engaged by said stops and held over said slots whereby the same will be carried forward to said wires and strung thereon.

8. In a washer sorting and stringing machine, a suitable frame, a washer sorting wheel rotatably mounted thereon, a plurality of circumferentially spaced radial plates carried by said wheel, each of said plates provided at the outer edge thereof with a plurality of spaced slots, each of said slots arranged in circumferential alinement with a similar slot in the other plates, a stop adjacent each slot arranged to engage a washer and detachably hold it in a position with its aperture over the slot; means to support a plurality of wires whereby the same will extend transversely of a radius of said wheel and will be held in a flexed condition with the end portion of each wire bearing against the bottom of one of said slots and the point thereof positioned in the path of the washer carried over the like slot in the adjacent plate; a hopper above said wheel, said hopper arranged to deliver washers thereto, means to rotate said wheel and means to supply washers to said hopper.

9. In a washer sorting and stringing machine, a suitable frame, a washer sorting wheel rotatably mounted thereon, a plurality of circumferentially spaced radial plates carried by said wheel, each of said plates provided at the outer edge thereof with a plurality of spaced slots, each of said slots arranged in circumferential alinement with a similar slot in the other plates, a stop adjacent each slot arranged to engage a washer and detachably hold it in a position with its aperture over the slot; means to support a plurality of wires whereby the same will extend transversely of a radius of said wheel and will be held in a flexed condition with the end portion of each wire bearing against the bottom of one of said slots and the point thereof positioned in the path of the washer carried over the like slot in the adjacent plate; a hopper above said wheel, said hopper arranged to deliver washers thereto, means to rotate said wheel, a conveyor belt mounted on said frame, said belt arranged to carry washers to said hopper and a chute positioned below said wheel, said chute arranged to receive the washers not engaged by said stops and deliver the same to said belt.

10. In a washer stringing device, a plate having a beveled forward edge, notches extending into said plate from said edge, means adjacent each notch to engage a washer and hold the same in position over the notch, a wire for each notch, means to detachably hold said wires in fixed positions and means to impart a movement to said plate whereby the beveled edge thereof will be moved toward said wires and one of the wires entered in each of said notches whereby the washers held above the notches will be strung thereon.

11. In a washer applying device, a rotatably mounted washer applying wheel, including, substantially rectangular radial plates, the outer edge of each plate being inclined to a radius of the wheel whereby the side presented to the direction of rotation will be of less area than the other side thereof, a plurality of rows of circumferentially alined notches in the outer edges of said plates, means adjacent each notch to engage a washer and detachably hold the same in position thereabove, a wire for each row of notches, means to rotate said wheel and means to support said wires and hold the same in position with the points thereof presented to said inclined edge and entered in said notches, means to feed a supply of washers to said wheel and means to rotate the wheel whereby the washers held above each notch will be fed on the wire entered therein.

12. An automatic machine for sorting and stringing washers having a convex face, including a member having a flat surface; means to feed washers thereto; means to cause said washers to slide to one edge thereof; said member provided with a plurality of slots in said edge; a stop at each side of each slot; said stops projecting from said surface a distance substantially equal to the thickness of the washer, whereby a washer, convex side up will be engaged thereby and held over each of said slots, a wire for each of said slots; means to support said wires; means to prevent the slotted edge of said member to said wires whereby a wire will be entered in each slot and the washers strung thereon, means to receive the washers sliding from said member and deposit the same in said feeding means.

13. A washer stringing machine comprising a member having a surface adapted to receive a quantity of washers thereon, said member having a washer engaging seat on said surface, means to turn said member to move said washer engaging seat in an endless path, said member provided with a groove disposed in said path and means to support a wire with the free end thereof positioned in said groove whereby a continued movement of said member will repeatedly bring said seat to the free end of said wire.

14. A washer stringing machine comprising a member having a surface adapted to receive a quantity of washers thereon, said member having a seat for engaging a washer upon movement of said member; means actuating said member to move said washer engaging seat in an endless path, said member provided with a groove disposed in said path and means to support a wire with the free end thereof positioned in said groove whereby said seat will be brought repeatedly to the point of said wire.

15. A washer stringing machine comprising a member having washer engaging seats arranged in a circumferentially alined path, means to rotate said member, said member provided with a groove disposed in said path and means to support a wire with the free end thereof positioned in said groove whereby a continued rotation of said member will repeatedly bring said seats to the free end of said wire and impale washers positioned therein on said wire.

16. A washer stringing machine comprising a member having a surface adapted to receive a quantity of washers thereon, said member having a washer engaging pocket, means to rotate said member whereby the portion thereof containing said pocket will describe a circular path, said member provided with a groove disposed in said path, a wire, means to support said wire with the free end thereof positioned in said groove whereby a movement of said member will cause a washer to be positioned in said pocket and carried forwardly in said path and impaled on said wire.

17. A washer stringing machine comprising a member having a surface adapted to receive a quantity of washers thereon, said member having a washer engaging pocket, means to move said member to cause the portion thereof containing said pocket to describe an endless path and cause a relative sliding movement between the washers and the member whereby a washer will be deposited in said pocket, said member provided with a groove disposed in said path, a wire, means to support said wire with the free end thereof positioned in said groove whereby a movement of said member will cause a washer to be positioned in said pocket and carried forwardly in said path and impaled on said wire.

18. A washer stringing machine comprising a rotatable member, said member provided with a plurality of circumferentially alined washer holding pockets, means to rotate said member, said member provided with a groove leading through said pockets, a wire, means to support said wire with the free end thereof positioned in said groove whereby a rotary movement of said member will cause washers positioned in said pockets to be carried forwardly and impaled on said wire.

19. A washer stringing machine comprising a member having a surface with a washer engaging pocket therein; means to move said member so that the portion thereof containing said pocket will describe a circular path, said member provided with a wire guiding groove which leads through the center of said pocket, means to support a wire with the end portion thereof positioned in said groove whereby a washer positioned in said pocket will be carried forwardly and impaled on said wire.

20. A washer stringing machine comprising a member having a washer engaging pocket, means to turn said member so that the portion thereof containing said pocket will describe a circular path, said member provided with a wire receiving groove leading through the center of said pocket, means to hold a wire with the end portion thereof positioned in said groove whereby a washer positioned in said pocket will be carried forwardly by the movement of said member and impaled on said wire.

21. A washer stringing machine comprising a member having a surface with a washer engaging pocket therein, means to move said member to cause the portion thereof containing said pocket to move in a circular path, said member provided with a groove which is positioned in said path, the axis of the said groove intersecting the axis of the pocket at a right angle, means to support a wire with the free end thereof positioned in said groove whereby a washer positioned in said pocket will be carried forwardly by the movement of said member and strung on said wire.

22. In a device of the class described the arrangement of a member having means associated therewith whereby a washer may be held in a certain position and means for moving the member to cause the washer holding means to completely describe an orbit, a wire, stationary means to hold the wire with the point thereof positioned to successively receive washers from said washer holding means at each orbital movement thereof.

23. In a device of the class described, the arrangement of a member having means associated therewith whereby a washer may be held in a certain position and means for moving the member to cause the washer holding means to completely describe an orbit, means to feed washers to said member whereby a washer will be engaged by said holding means by the movement of said member, a wire, stationary means to hold the wire in a fixed position with the point thereof positioned to successively receive washers from said washer holding means at each orbital movement thereof.

24. In a device of the class described, the arrangement of a member having washer holding means, means for turning the member to cause the washer holding means to completely describe an orbit, a wire, means to hold one end of the wire in a fixed position and means associated with the member to guide the point of the wire to the aperture of a washer positioned in said washer holding means.

25. In a device of the class described, a revolving member, means on said member for holding a washer; a wire; stationary means for holding one end of the wire in a fixed position and means on said member for holding the other end of the wire in a position to receive a washer positioned in said washer holding means.

26. In a device of the class described, a rotatable member, means to rotate said member, said member having a plurality of washer holding seats; said seats arranged in circumferentially alined rows, a plurality of wires, means to support said wires with the free end of a wire presented to each row of seats and means on the member itself to hold the free end of each wire in a position to receive washers positioned in said seats.

In testimony whereof, I have hereunto set my hand.

ALOYS SCHONENBERGER.